May 24, 1966 A. SELNES 3,252,195
BUCKLE FOR SAFETY BELTS
Filed Oct. 21, 1963 2 Sheets-Sheet 1
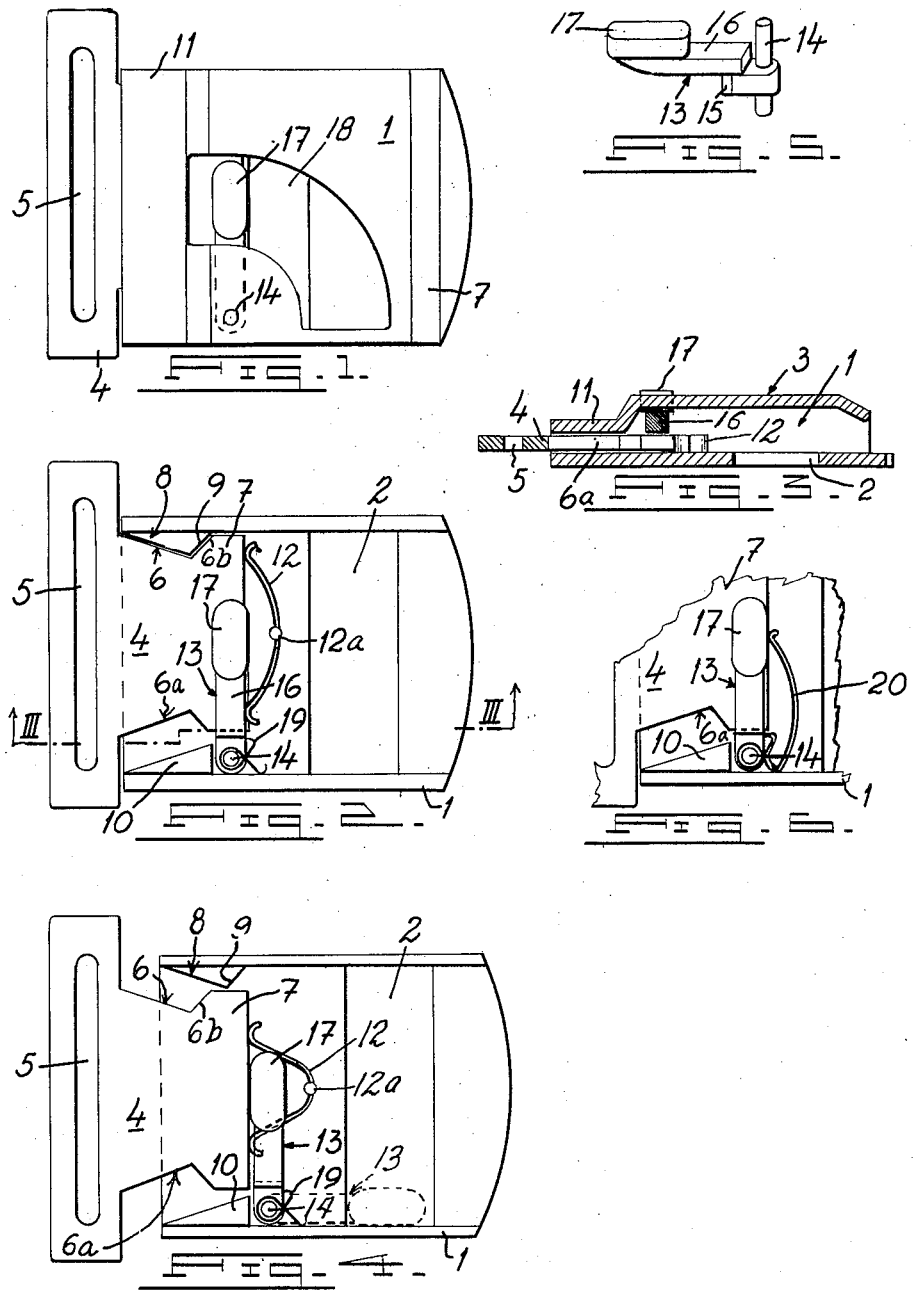
INVENTOR
ARNOLD SELNES May 24, 1966 A. SELNES 3,252,195
BUCKLE FOR SAFETY BELTS
Filed Oct. 21, 1963 2 Sheets-Sheet 2
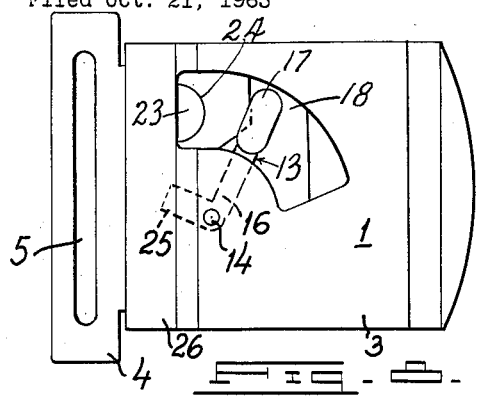
FIG. 8.
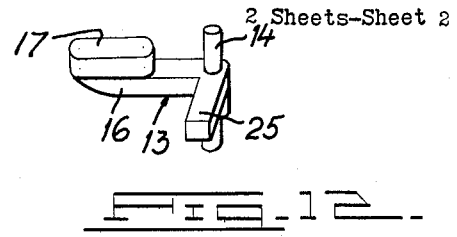
FIG. 12.
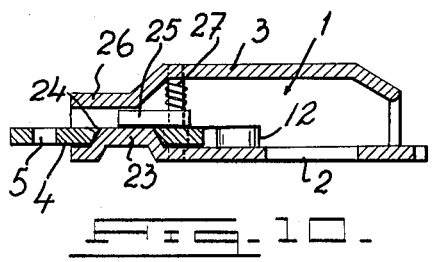
FIG. 10.
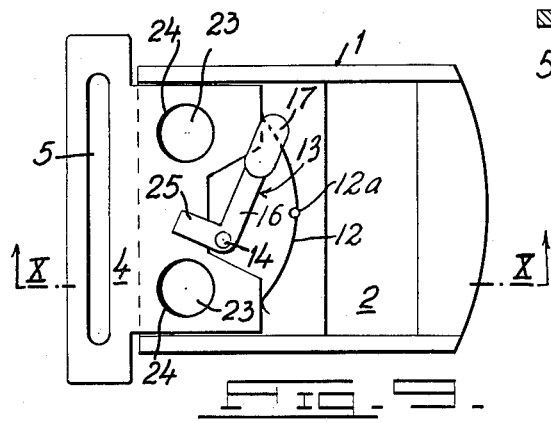
FIG. 9.
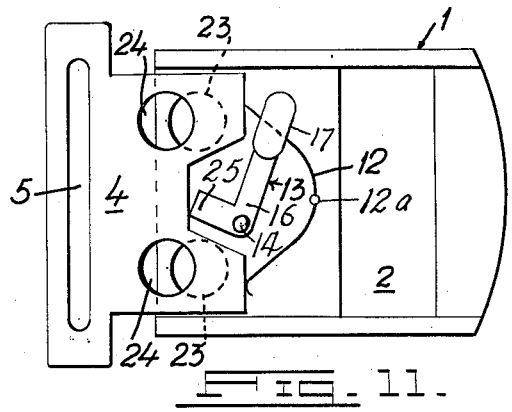
FIG. 11.
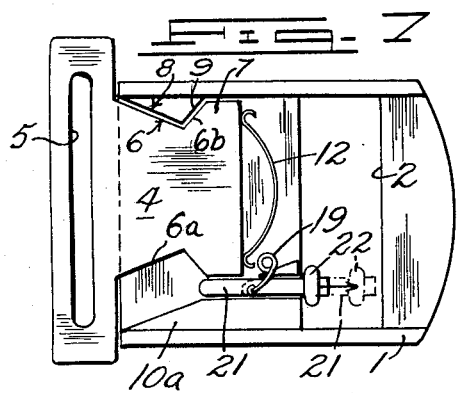
FIG. 7.
INVENTOR
ARNOLD SELNES
BY 
Atty

United States Patent Office 3,252,195
Patented May 24, 1966

3,252,195
BUCKLE FOR SAFETY BELTS
Arnold Selnes, Huitfeldtsgate 28, Oslo, Norway
Filed Oct. 21, 1963, Ser. No. 317,516
13 Claims. (Cl. 24—230)

The invention relates to a quick-release locking mechanism for safety belts and the like. Such a locking mechanism is used primarily with safety belts in motor cars and aircraft. Existing locking mechanisms have the disadvantage that the lock, fastened under tension, cannot be easily and quickly opened, but only with some exertion, because the interlocking parts are too heavily stressed. The difficulty in releasing them is mainly due to the fact that the interlocking parts are at right angles to each other, so that considerable energy has to be expended in moving the parts that bear against each other. However, if the pressure holding the interlocking parts to each other were to be reduced, there would be risk of the lock failing to hold securely enough, so that it would not be able to meet the demands made on a safety belt. At the same time, an essential requirement of a safety belt is that it should be possible to release the belt effortlessly and, above all, quickly.

An object of this invention is to provide a quick-release locking mechanism in which the above mentioned drawbacks are eliminated and which, while ensuring a secure grip when closed, can be effortlessly and, in particular, quickly opened.

According to the present invention there is provided a quick-release locking mechanism which comprises a sleeve member, a tongue insertable into said sleeve member, a pair of cam surfaces formed one on said sleeve member and the other on said tongue and engageable with each other by displacement of the tongue relative to the sleeve member in a direction transverse to the direction of insertion of the tongue into the sleeve member, said cam surfaces being inclined to the direction of insertion so as to effect displacement of said tongue in the direction opposite to said transverse direction when said tongue is urged in a direction opposite to the direction of insertion, and releasable locking means operable when said cam surfaces are engaged to prevent displacement of said tongue in the direction opposite to said transverse direction.

Embodiments of a quick-release locking mechanism according to the present invention will now be described, by way of example, with reference to the accompanying drawings, in which:

FIGURE 1 is a front view of the locking mechanism in the closed position,

FIGURE 2 is a similar view to FIGURE 1 with the cover plate removed,

FIGURE 3 is a longitudinal section taken on the line III—III of FIGURE 2 but with the cover plate in place, FIGURE 4 is a front view of the locking mechanism with the cover plate removed and with the tongue partially inserted into the sleeve member, FIGURE 5 is a perspective view of the locking means, FIGURE 6 is a partial view of a part of the locking means according to a modified form, FIGURE 7 is a partial view of a part of the locking means according to a further modified form, FIGURE 8 is a front view of a modified locking mechanism in the closed position, FIGURE 9 is a similar view to FIGURE 8 with the cover plate removed, FIGURE 10 is a longitudinal section taken on the line X—X of FIGURE 9 but with the cover plate in place, FIGURE 11 is a front view of the locking mechanism of FIGURE 9 with the tongue member in the position immediately prior to the locked position, and FIGURE 12 is a perspective view of the locking means.

Referring to FIGURES 1 to 5, the locking mechanism comprises a sleeve member 1, provided with a slot 2 for a belt and a removable cover plate 3. The second part of the locking mechanism comprises a tongue member 4, which carries a slot 5, for the attachment of the other part of the belt. The sleeve 1 is formed with a passage opening to one end thereof and having a mouth permitting insertion of the tongue member 4 and includes a guide 11, a cam 8 having a surface 9, and a guide cam 10 disposed opposite to the first mentioned cam 8. The tongue member 4 has a leading end 7 and is in the form of a plate having a width normal to its direction of insertion and a thickness normal both to its width and to the direction of insertion, which thickness is small relative to the width, and formed with cut-out portions 6 and 6a symmetrically disposed with respect to the direction of insertion.

The cam 8 and the guide cam 10 serve to centralize the tongue member 4 as it is initially inserted through the mouth of the passage. When the tongue member has been inserted a predetermined amount, it can be displaced or moved transversely to bring cam surface 6b of the cut-out portion 6 into engagement with the cam surface 9 of cam 8. Cam surface 9 and cam surface 6b are both inclined to the direction of insertion of the tongue member 4 so as to effect displacement of the tongue member and thus disengagement of such two cam surfaces when such tongue member is urged in the direction opposite to its direction of insertion. Spring member 12 anchored to the sleeve member 1 by the pin 12a is located in the path of insertion of tongue member 4 and opposes insertion of such tongue member on the one hand and urges the same in the direction opposite to the direction of insertion on the other hand.

A locking device 13 extends into the path of insertion of tongue member 4 and pivots around pin 14 in sleeve member 1. It is swung in a counterwise direction under the action of spring 19. The device 13 has a trip 15, which bears sideways against leading end 7 of the tongue member 4 when in the locking position and so prevents tongue member 4 from being moved sideways. On lever arm 16 of the device 13 is a knob 17, which projects through an arc-shaped slot 18 in cover plate 3 of the sleeve member 1 and can be gripped manually for the purpose of releasing the catch. Owing to the length of lever arm 16, the effort needed for turning device 13 against the action of spring 19 can be kept small.

As can be seen from FIGURE 4, as tongue member 4 is inserted into sleeve member 1, leading end 7 bears against device 13 and forces it back into the releasing position shown in broken lines. Once cam surface 6b has been brought into engagement with cam surface 9, the lever catch can be turned once more, with the assistance of spring 19, into the position shown in solid lines, in which position trip 15 slips behind leading end 7 at the side.

If device 13 is now swung into the position shown in broken lines in FIGURE 4, ejector spring 12 can eject tongue member 4 from the sleeve member, so that the lock opens automatically. This opening movement can take place with very little expenditure of energy, owing to the inclination of the cam surfaces 6b and 9.

Since the belt, when in use, is tensioned to some extent, this tension promotes the opening of the mechanism.

FIGURE 6 shows a form of construction in which a single spring 20 for turning device 13 and ejecting tongue member 4 comprises a curved portion, which acts on leading end 7 of the tongue, and a helical portion, which turns device 13 counterclockwise.

Instead of a turning device, a sliding device of the type illustrated in FIGURE 7 and numbered 21 may equally well be provided. A device of this kind can slide between guide cam 10a and leading end 7 of tongue 4 when the tongue member is in the "locked" position, a spring (not shown) being used for this purpose. Device 21 is provided with a knob 22 which projects through a straight slot in cover 3.

In the form of construction shown in FIGURES 8 to 12, there is a sleeve member 1, provided with a slot 2, for the attachment of a belt, and with a front cover plate 3.

In this form of construction, the sleeve member has frustoconical projections 23. Tongue member 4 is provided with a slot 5 for the attachment of the other part of the belt, and has corresponding conical cut-outs, 24. Projections 23 and cut-outs 24 can be engaged and disengaged by movements perpendicular to tongue member 4 itself. To secure them in engagement, device 13 is provided, this device having a locking arm 25, which bears down on tongue member 4 in the locked position. During the insertion of tongue member 4 through guide 26 into sleeve member 1, locking arm 25 lies level with the tongue member and is therefore forced back by it. Device 13 is brought into the operative position by spring 27.

As before, device 13 pivots around pin 14 in sleeve member 1 and carries an arm 16 and a knob 17, which projects through an arc-shaped slot 18 in the sleeve cover 3 and can be gripped manually for operation purposes. In this form of construction, too, the tongue member is acted on by ejector spring 12, which brings about the ejection of the tongue from the sleeve when catch 13 is released. This is made possible by virtue of the conical shape of cut-outs 24 and projections 23, which thus slide apart quickly and without force being required.

I claim:

1. A quick-release locking mechanism comprising a flat sleeve member providing a restricted passage, a flat tongue member insertable into said passage and having a transverse dimension less than the corresponding transverse dimension of said passage so as to permit limited movement of said tongue member in said passage in a direction transverse to the direction of insertion of said tongue member into said passage, a first cam surface formed on one of said members, a second cam surface formed on the other of said members and engageable with said first cam surface when said tongue member is moved in said transverse direction in said passage, said cam surfaces being inclined to said direction of insertion so as to effect movement of said tongue member in the direction opposite to said transverse direction when said tongue member is urged in the direction opposite to said direction of insertion, spring means opposing insertion of said tongue member into said passage and urging said tongue member in said direction opposite to said direction of insertion, locking means associated with said sleeve member and movable between a locking position in which it engages said tongue member to positively hold the same against transverse movement and thereby prevent its withdrawal from said passage and a releasing position in which such transverse movement and withdrawal of said tongue member can take place under urging of said tongue member by said spring means, and means biasing said locking means into its locking position.

2. A locking mechanism according to claim 1, in which the first cam surface is formed on said sleeve member and extends into said passage, and the second cam surface is formed on said tongue member.

3. A locking mechanism according to claim 1, in which the locking means in its locking position extends into the path of insertion of said tongue member and is displaced away from said locking position upon engagement by said tongue member upon insertion of the latter into said passage.

4. A locking mechanism according to claim 1, in which said sleeve member is provided with a slot, and said locking means is provided with a manually engageable projection extending through said slot and operable to move said locking means to its releasing position against the action of said biasing means thereon.

5. A quick-release locking mechanism comprising a flat sleeve member providing a restricted passage, a flat tongue member insertable into said passage and having a thickness corresponding to the height of said passage and a width less than the width of said passage so as to permit limited widthwise movement of said tongue member in said passage in one direction transverse to the direction of insertion of said tongue member into said passage, a first cam surface formed on said sleeve member and extending into said passage, a cut-out portion formed in said tongue member and defining a second cam surface engageable with said first cam surface when said tongue member is moved in said transverse direction in said passage, said cam surfaces being inclined to said direction of insertion so as to effect movement of said tongue member in the direction opposite to said transverse direction when said tongue member is urged in the direction opposite to said direction of insertion, spring means opposing insertion of said tongue member into said passage and urging said tongue member in said direction opposite to said direction of insertion, locking means associated with said sleeve member and movable between a locking position in which it engages said tongue member to positively hold the same against transverse movement and thereby prevent its withdrawal from said passage and a releasing position in which such transverse movement and withdrawal of said tongue member can take place under urging of said tongue member by said spring means, said locking means in its locking position extending into the path of insertion of said tongue member and being displaceable away from said locking position upon engagement by said tongue member upon insertion of the latter into said passage, and means biasing said locking means into its locking position.

6. A locking mechanism according to claim 5, in which said tongue member is formed with a second cut-out portion defining a third cam surface corresponding to said second cam surface, said two cut-out portions being symmetrically disposed with respect to the length of said tongue member whereby either of said second and third cam surface is engageable with said first cam surface depending upon the orientation of said tongue member during its insertion into said passage.

7. A locking mechanism according to claim 5, in which said locking means is pivotally mounted in said sleeve member.

8. A locking mechanism according to claim 5, in which said locking means is reciprocably mounted in said sleeve member.

9. A locking mechanism according to claim 5, in which said spring means and said biasing means are constituted by a single spring element.

10. A locking mechanism according to claim 5, in which said sleeve member is provided with a slot, and said locking means is provided with a manually engageable projection extending through said slot and operable to move said locking means to its releasing position against the action of said biasing means thereon.

11. A quick-release locking mechanism comprising a flat sleeve member providing a restricted passage, a flat tongue member insertable into said passage and having a width corresponding to the width of said passage and a thickness less than the height of said passage so as to permit limited thickness-wise movement of said tongue member in said passage in one direction transverse to the direction of insertion of said tongue member into said passage, at least one frustoconical projection formed on said sleeve member and defining a first cam surface extending into said passage, at least one aperture formed in said tongue member and defining a second cam surface engageable with said first cam surface when said tongue member is moved in said transverse direction in said passage, said cam surfaces being inclined to said direction of insertion so as to effect movement of said tongue member in the direction opposite to said transverse direction when said tongue member is urged in the direction opposite to said direction of insertion, spring means opposing insertion of said tongue member into said passage and urging said tongue member in said direction opposite to said direction of insertion, locking means associated with said sleeve member and movable between a locking position in which it engages said tongue member to positively hold the same against transverse movement and thereby prevent its withdrawal from said passage and a releasing position in which such transverse movement and withdrawal of said tongue member can take place under urging of said tongue member by said spring means, said locking means in its locking position extending into the path of insertion of said tongue member and being displaceable away from said locking position upon engagement by said tongue member upon insertion of the latter into said passage, and means biasing said locking means into its locking position.

12. A locking mechanism according to claim 11, in which said sleeve member is formed with two of said frustoconical projections, and said tongue member is formed with two of said apertures.

13. A locking mechanism according to claim 11, in which said sleeve member is provided with a slot, and said locking means is provided with a manually engageable projection extending through said slot and operable to move said locking means to its releasing position against the action of said biasing means thereon.

References Cited by the Examiner

UNITED STATES PATENTS

| 1,223,574 | 4/1917 | Fedczyszyn | 24—230 |
| 2,904,866 | 9/1959 | Carter | 24—75 X |
| 2,965,942 | 12/1960 | Carter | 24—170 |

FOREIGN PATENTS

| 123,704 | 10/1901 | Germany. |
| 218,779 | 7/1924 | Great Britain. |
| 434,335 | 8/1935 | Great Britain. |

WILLIAM FELDMAN, *Primary Examiner.*

DONLEY J. STOCKING, *Examiner.*

E. SIMONSEN, *Assistant Examiner.*